United States Patent
Nakajima et al.

(10) Patent No.: US 6,988,918 B2
(45) Date of Patent: Jan. 24, 2006

(54) AIR INTAKE STRUCTURE FOR A SMALL WATERCRAFT

(75) Inventors: Jun Nakajima, Saitama (JP); Tadaaki Nagata, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 54 days.

(21) Appl. No.: 10/668,612

(22) Filed: Sep. 23, 2003

(65) Prior Publication Data

US 2004/0235369 A1 Nov. 25, 2004

(30) Foreign Application Priority Data

Sep. 27, 2002 (JP) ........................................ 2002-284220

(51) Int. Cl.
*B63H 21/10* (2006.01)

(52) U.S. Cl. ..................................................... 440/88 A
(58) Field of Classification Search ............... 440/88 A, 440/88 R
See application file for complete search history.

(56) References Cited

U.S. PATENT DOCUMENTS

| 4,513,727 A | * | 4/1985 | Lagano et al. ............... 123/525 |
| 4,556,031 A | * | 12/1985 | Sugiura ....................... 123/437 |
| 4,827,722 A | * | 5/1989 | Torigai ......................... 60/599 |
| 6,390,869 B2 | * | 5/2002 | Korenjak et al. .......... 440/88 R |

* cited by examiner

*Primary Examiner*—Stephen Avila
(74) *Attorney, Agent, or Firm*—Carrier, Blackman & Associates, P.C.; William B. Blackman; Joseph P. Carrier

(57) ABSTRACT

An air intake structure for a small watercraft is provided, in which the air intake efficiency is improved. A watercraft body 11 includes a hull and a deck for covering on top of the hull. An engine 20 is disposed in the watercraft body 11, and a propeller 30 is driven by a drive shaft 22, extending rearwardly from the engine 20. A turbocharger 24 is provided for pumping air to the engine 20. An air cleaner case 40 is provided for introducing fresh air to the turbocharger 24. The turbocharger 24 is located at the rear of the engine 20, the air cleaner case 40 is located at the front of the engine 20, and a plurality of air ducts 71–73 are located at the front of the air cleaner case 40.

24 Claims, 9 Drawing Sheets

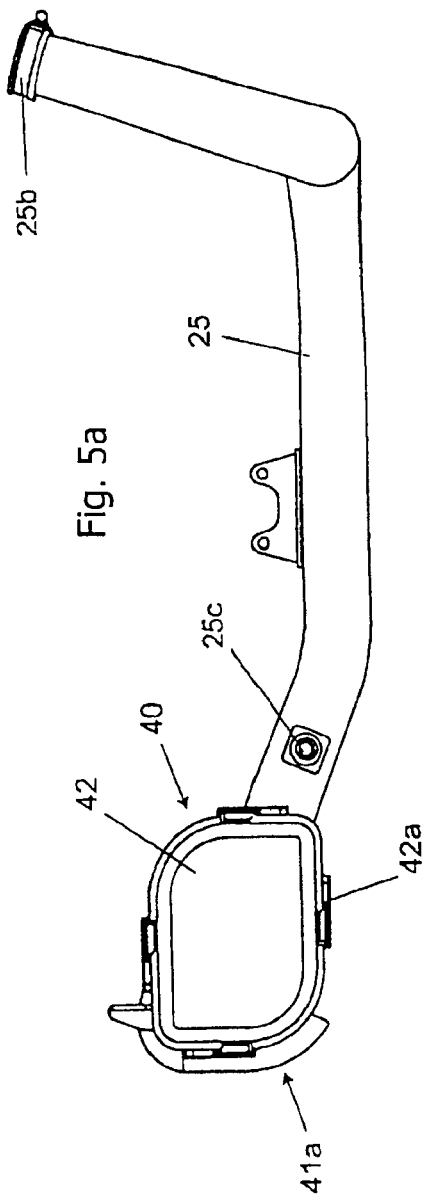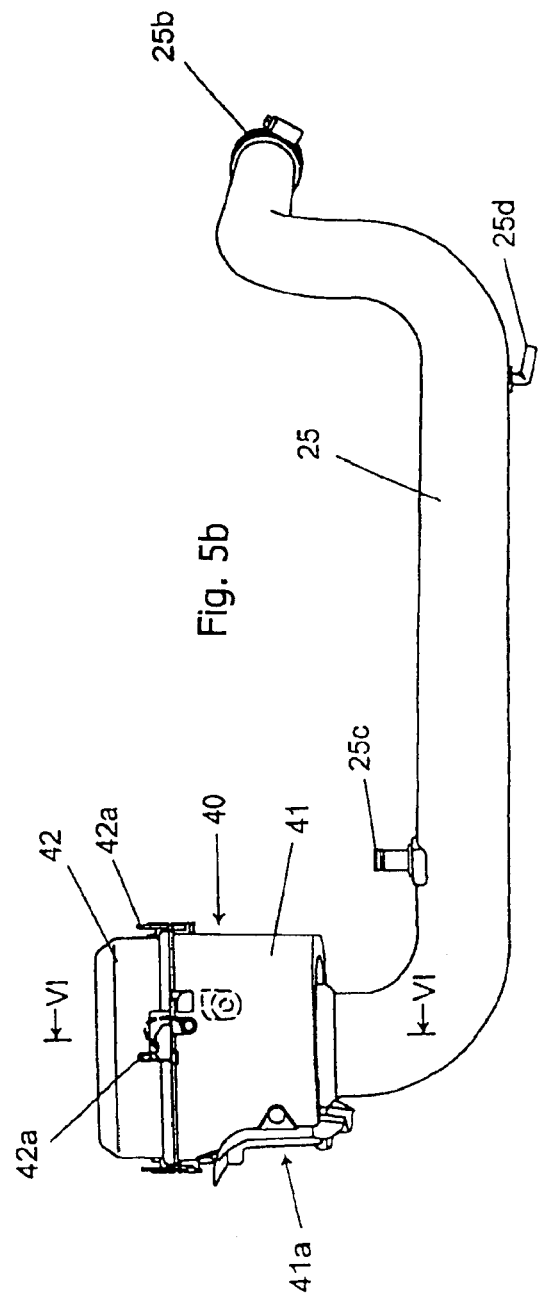

AIR INTAKE STRUCTURE FOR A SMALL WATERCRAFT

CROSS-REFERENCE TO RELATED APPLICATIONS

The present application claims priority under 35 U.S.C. 119, based on Japanese patent application No. 2002-284220, filed Sep. 27, 2002.

BACKGROUND OF THE INVENTION

1. Field of the Invention

The present invention relates to an air intake structure for a small watercraft. More particularly, the present invention relates to an air intake structure for a small watercraft in which the air intake efficiency is improved, and thus the power output of the engine may be improved.

2. Description of the Background Art

A number of different air intake structures for small watercraft have been known. An air intake structure for a small watercraft is disclosed in Japanese Patent Document JP-A-2000-335486. The air intake structure disclosed in this reference includes an air intake silencer in front of the engine, for introducing fresh air thereto. The air intake disclosed in the reference also includes a plurality of air ducts for communicating between the interior and the exterior of the watercraft body, wherein openings of the air ducts in the watercraft are disposed separately at the front and the back of the air intake silencer.

When providing a turbocharger on an engine for improving its output, generally, the turbocharger and air intake components for introducing fresh air thereto (air intake silencer or air cleaner case) are disposed adjacent to each other, in other words, are disposed together either at the front or the back of the engine. A connecting pipe can shorten the distance between the turbocharger and the air intake components.

Therefore, in the published art described above, the turbocharger is generally located on the side of the engine where the air intake silencer is located; that is, at the front of the engine.

Alternatively, when locating the turbocharger at the back of the engine, the air intake components are generally located at the back of the engine.

However, when a small watercraft is equipped with a turbocharger, improvement in the power output of the engine has been less than expected.

As a result of research, it was found that since there is not a large amount of space inside the small watercraft, high air temperatures tend to persist in the watercraft. In general, lower intake air temperatures generally correlate to higher engine power, since cooler air is denser.

The turbocharger itself is a heat source, and when the turbocharger and the air intake components are located close together, high temperature air around the turbocharger is easily introduced into the air intake, whereby air intake temperature increases, lowering the engine power output.

In the air intake structure for a small watercraft according to Japanese Patent Document JP-A-2000-335486, the openings of the air ducts in the watercraft are separately disposed at the front and rear of the air intake silencer. As a result, air is drawn into the air intake silencer through the opening of the air duct disposed at the front, and also through the opening of the air duct disposed at the rear. However, since the air intake silencer is located forward of the engine, air from the air ducts located at the rear is routed from the air intake silencer through the area surrounding the engine, which is a heat source.

Accordingly, since a large amount of high temperature air around the engine is drawn into the air intake silencer, there is a problem in that the air intake efficiency is lowered due to increase in intake temperature, and the output of the engine is also undesirably lowered.

Although the known devices have some utility for their intended purposes, a need still exists in the art for an improved air intake for use in a small watercraft. In particular, there is a need for an improved air intake structure for a small watercraft in which the air intake efficiency is improved, and thus the power output of the engine may be improved.

SUMMARY OF THE INVENTION

The present invention provides an air intake structure for a small watercraft in which the air intake efficiency is improved, and thus the power output of the engine may be improved.

A first object of the present invention is to provide an air intake structure for a small watercraft in which the above-described problems are overcome, and air intake efficiency is improved when a turbocharger is installed, and the power output of the engine may be improved.

In a small watercraft, the engine compartment is necessarily small. When the engine of a small watercraft is operated, a plurality of air ducts connected to the engine will serve as intake ducts, due to the suction action of the engine.

A second object of the present invention is to provide an air intake structure for a small watercraft in which the above-described problems are overcome, the air intake efficiency is improved, and thus the power output of the engine may be improved.

In order to achieve the first object described above, in a first embodiment, the present invention provides an air intake structure for a small watercraft including a watercraft body having a hull constituting the lower portion thereof, and a deck for covering on top of the hull.

The watercraft also has an engine disposed in the watercraft body, a propeller driven by a drive shaft extending rearward from the engine, and a turbocharger for pumping intake air to the engine.

An air cleaner case is provided for introducing fresh air to the turbocharger, and according to the practice of a first embodiment of the present invention, the turbocharger and the air cleaner case are separately disposed at the front and the rear of the engine, respectively.

In a second embodiment, the present invention provides an air intake structure for a small watercraft including a watercraft body having a hull constituting the lower portion thereof, and a deck for covering on top of the hull. The watercraft also has an engine disposed in the watercraft body, a propeller driven by a drive shaft extending rearward from the engine, and a turbocharger for pumping intake air to the engine.

An air cleaner case is provided for introducing fresh air to the turbocharger, and according to the practice of a second embodiment of the present invention, a plurality of air ducts for communicating the interior and the exterior of the watercraft body, all have openings which are disposed on the same side of the engine as the air cleaner case.

In one arrangement of engine components according to the invention, a turbocharger is disposed at the rear of the engine, and the air cleaner case is disposed at the front of the engine, with all the openings of the plurality of air ducts in the watercraft disposed at the front of the air cleaner case.

As a result of disposing the turbocharger and the air cleaner case separately at the front and the rear of the engine according to the first embodiment hereof, the air cleaner is spaced away from the turbocharger, which is a heat source.

Therefore, hot air around the turbocharger will be prevented from entering the air cleaner case, and thus the temperature of air going into the intake is lowered, the efficiency is improved and the power output of the engine is improved.

Since, in the second embodiment hereof, all the openings of the plurality of air ducts in the watercraft are disposed on the same side as the air cleaner case with respect to the engine, hot air around the engine will not be drawn into the air cleaner case. Instead, cooler air from outside of the engine compartment will be drawn into the air cleaner case, lowering the average intake air temperature.

Therefore, the air intake efficiency is improved, and the engine power output is improved.

As a result of disposing the turbocharger at the rear of the engine, and the air cleaner case at the front of the engine, the air cleaner case is located away from the turbocharger, which is a heat source, and thus hot air around the turbo charger will not be drawn into the air cleaner case.

In addition, since all the openings of the plurality of air ducts in the watercraft are disposed at the front of the air cleaner case, which is the same side as the air cleaner case with respect to the engine, hot air around the engine will not be drawn into the air cleaner case.

Therefore, according to the air intake structure for a small watercraft according to the invention, hot air around the turbocharger and hot air around the engine will not be drawn into the air cleaner case, and thus the air intake efficiency is further improved and thus the output of the engine is further improved.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 5 is a drawing showing an air cleaner case 40 and a fresh air duct pipe 25 according to a first embodiment of the invention, in which (a) is a top plan view, and (b) is a side plan view.

DETAILED DESCRIPTION

Figure 1:
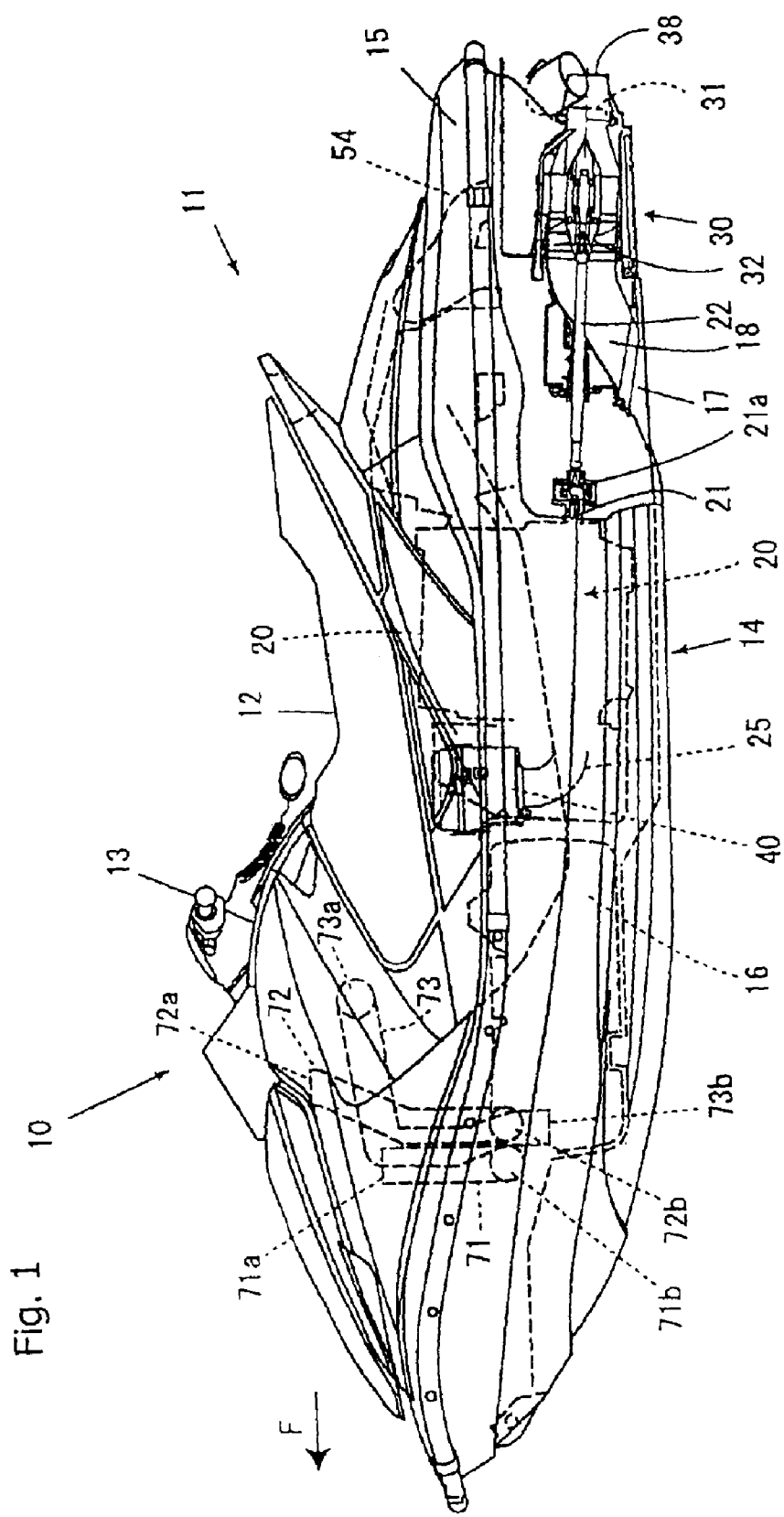
FIG. 1 is a side plan view, partially cut away, of a small watercraft employing an air intake structure according to an illustrative embodiment of the present invention.

Throughout the following description, expressions of "front", "rear", "left", and "right" denote the directions viewed from the vantage point of a driver.

As shown in the drawings (mainly in FIG. 1), a small watercraft 10 is a saddle riding type small watercraft, in which a rider is able to sit on a seat 12 of a watercraft body 11, and to operate the watercraft 10 while gripping a steering handle 13 with a throttle lever thereon.

The watercraft body 11 is a floating structure formed by joining a hull 14 and a deck 15, for defining an interior space 16 therebetween. In the interior space 16, an engine 20 is mounted on the hull 14, and a water jet propeller (hereinafter referred to as jet pump) 30 as propulsion means driven by the engine 20 is mounted at the rear of the hul 14.

The jet pump 30 includes an impeller 32 disposed in a channel 18, extending from a water intake 17 opening toward the bottom through a jet flow port 31 opening toward the rear end of the watercraft body to a deflector 38. A drive shaft 22 is provided behind the engine 20, for driving the impeller 32. The drive shaft 22 is connected to an output shaft 21 of the engine 20 via a coupler 21a.

Therefore, when the impeller 32 is rotated by the engine 20 via the coupler 21a and the shaft 22, water taken from the water intake 17 is injected from the jet flow port 31 through the deflector 38, whereby the watercraft body 11 is propelled forwardly.

The speed of the engine 20, that is, a propelling power generated by the jet pump 30, is controlled by rotating a throttle lever of the operating handle 13.

The deflector 38 is linked to the operating handle 13 via an operating wire (not shown), and is pivotally moved by pivoting the operating handle 13 around a substantially vertical axis, whereby the direction of travel of the watercraft body 11 can be changed.

The Engine

Figure 3:
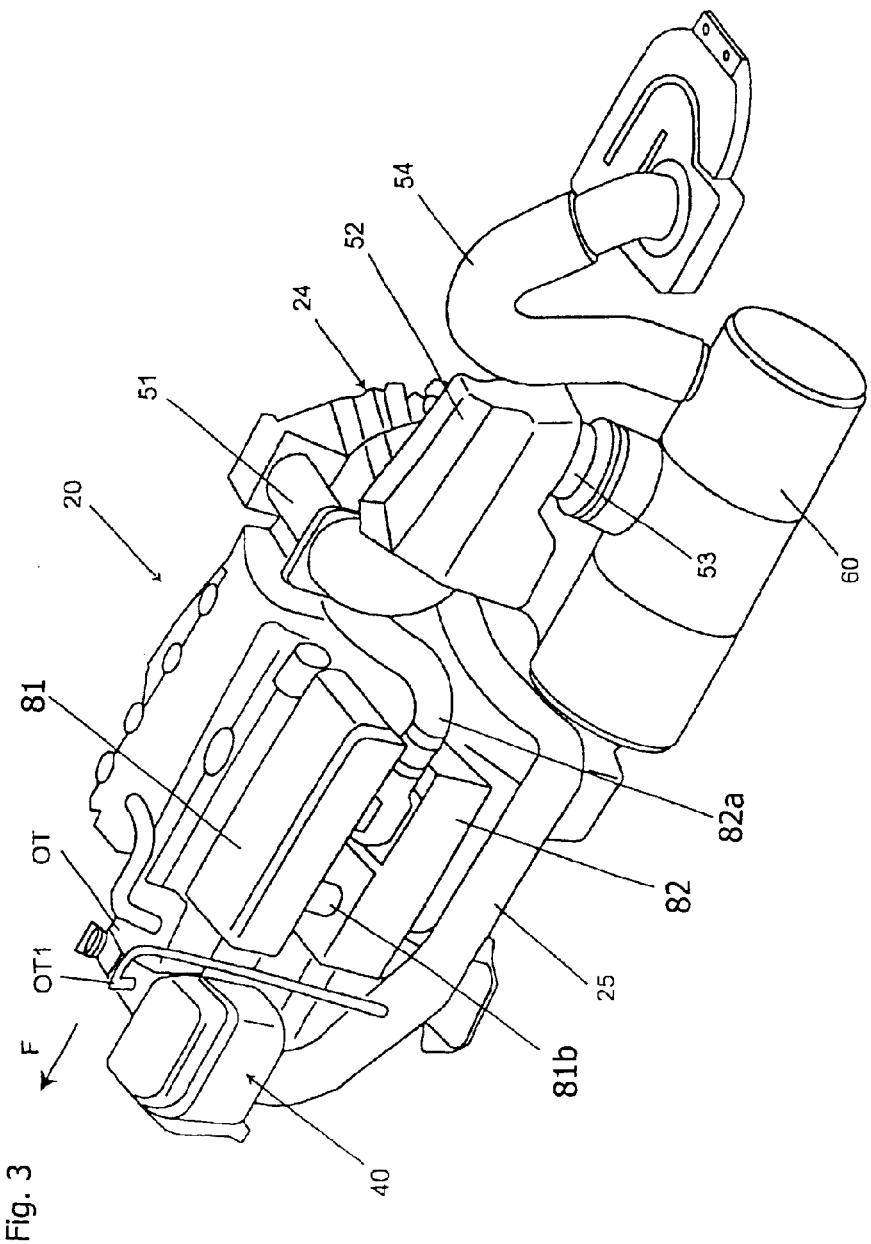
FIG. 3 is a perspective view of an engine 20 with an air intake according to the present invention installed thereon.

FIG. 3 is a general perspective view showing mainly the engine 20. The engine 20 illustrated in FIG. 3 is a four-cylinder in-line DOHC dry-sump, four-cycle engine. A crankshaft (See output shaft 21 in FIG. 1) of the engine 20 is oriented to extend along the fore-and-aft direction of the watercraft body 11.

As shown in FIG. 3, a surge tank (intake chamber) 81 and an intercooler 82 are connected on the left side of the engine 20, and an exhaust manifold 23 (FIG. 2) is connected on the right side of the engine 20.

A turbocharger (supercharger) 24 for pumping compressed intake air to the engine 20 is disposed at the back of the engine 20. An air cleaner case 40 is disposed at the front of the engine 20, for introducing fresh air through a fresh air duct pipe 25 to the turbocharger 24.

An exhaust port of the exhaust manifold 23 (FIG. 2) is in fluid communication with an internal turbine drive unit of the turbocharger 24. The intercooler 82 is in fluid communication with a compressor unit of the turbocharger 24 via a feed pipe 82a, and the surge tank (intake chamber) 81 is connected to the intercooler 82 via a connector pipe 81b.

Intake Air Routing

Therefore, fresh air from the air cleaner case 40 is supplied to the turbocharger 24 via the fresh air duct pipe 25. In the turbocharger 24, the fresh air is compressed by the compressor unit, and the compressed air is supplied to the intercooler 82 via the pipe 82a, and cooled thereby. The cool, compressed air is then supplied to the engine 20 via the surge tank (intake chamber) 81.

Exhaust Air Routing

After passing through the turbine unit of the turbocharger 24, exhaust air is discharged through a first exhaust pipe 51. Downstream of the first exhaust pipe 51, the exhaust air enters a backflow-preventing chamber 52, for preventing backflow of water (entering of water to the turbocharger 24 and the like) when the small watercraft 10 is rolled over. After leaving the backflow-preventing chamber 52, the exhaust air travels through a second exhaust pipe 53 to a water muffler 60, and then flows from the water muffler 60 through an exhaust/drain pipe 54 to a water flow generated by the jet pump 30.

Air Ducts

Figure 2:
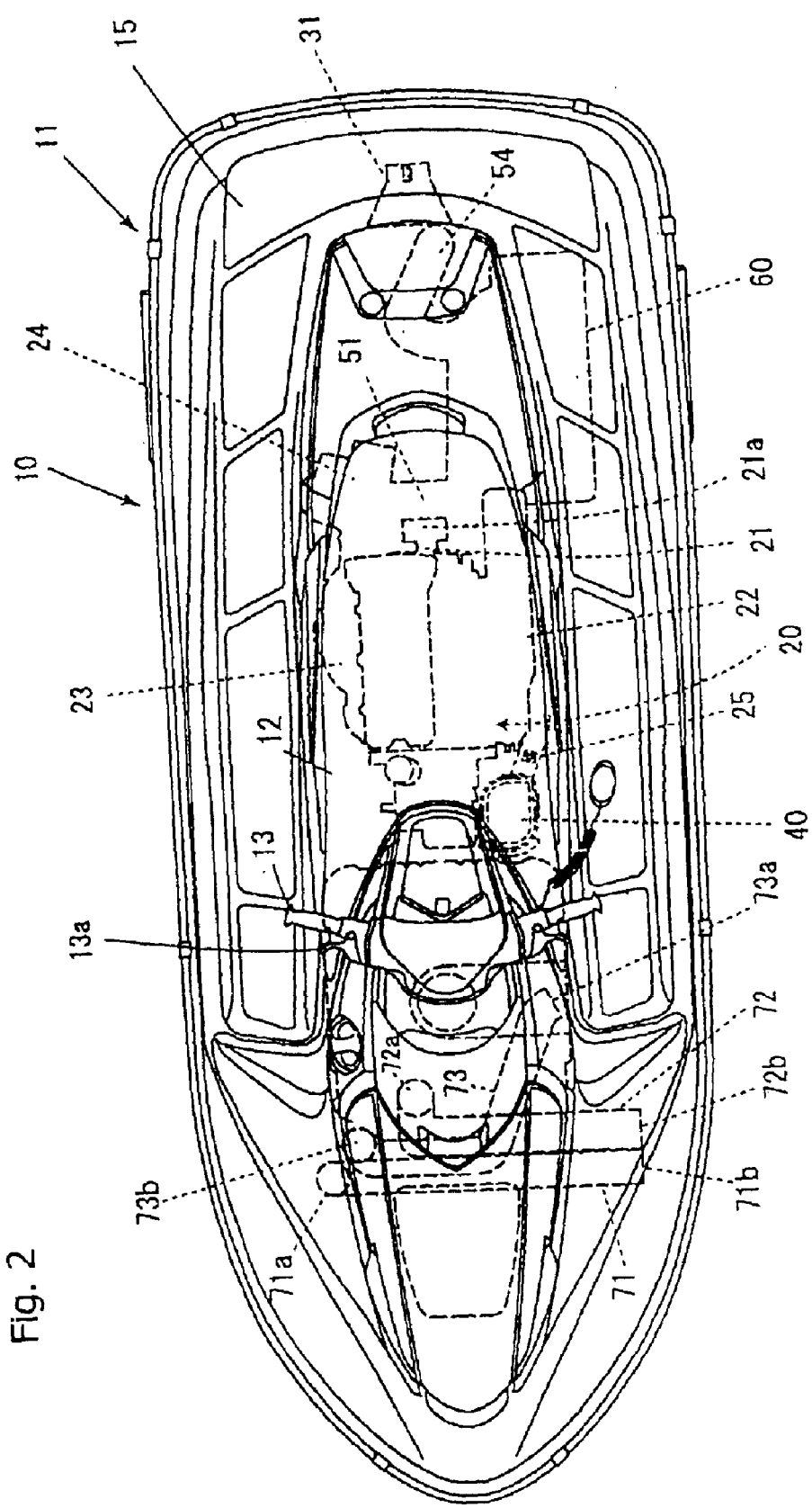
FIG. 2 is a top plan view of the watercraft of FIG. 1.

As shown in FIG. 1 and FIG. 2, the watercraft body 11 is provided with three air ducts 71, 72, 73 for routing air through the watercraft body.

Figure 4A:
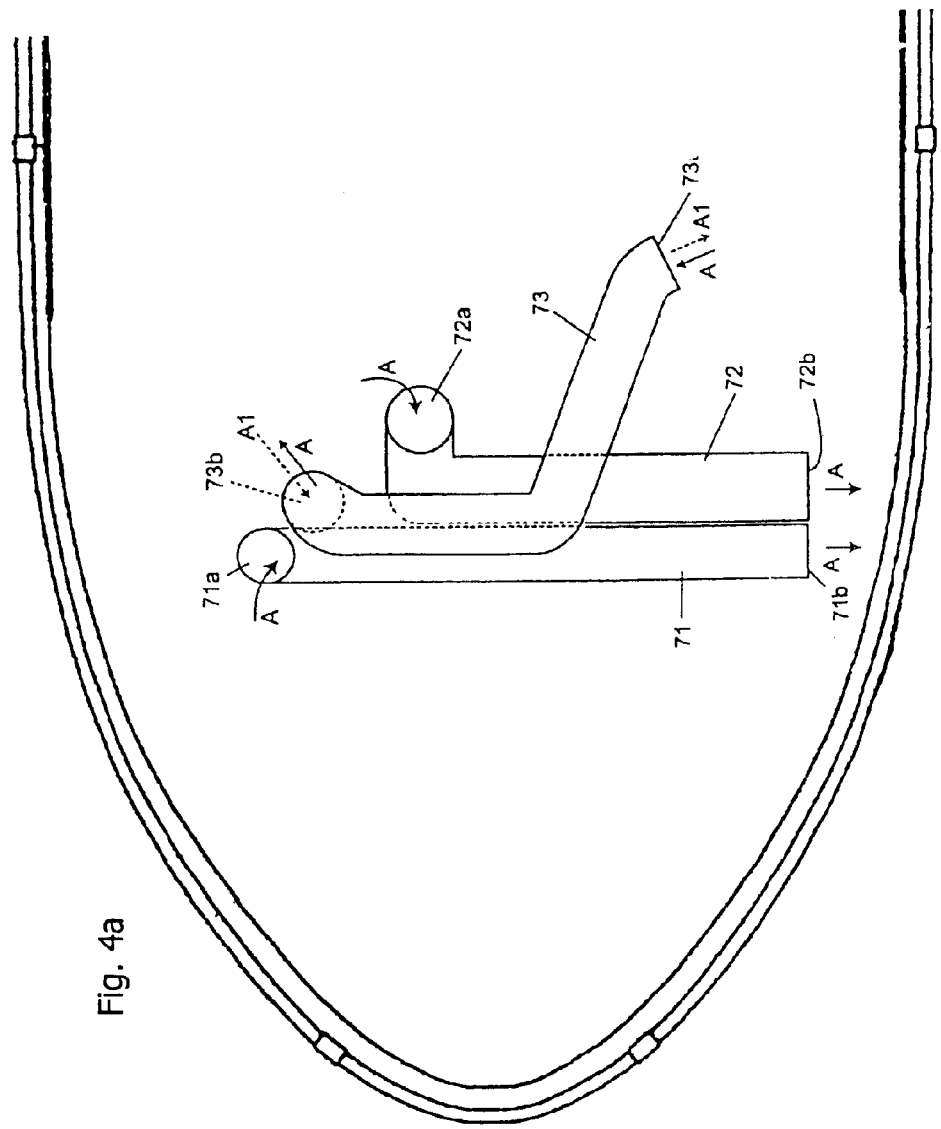
FIG. 4 is a drawing showing air ducts, in which (a) is a top plan view, and (b) is a front view.
Figure 4B:
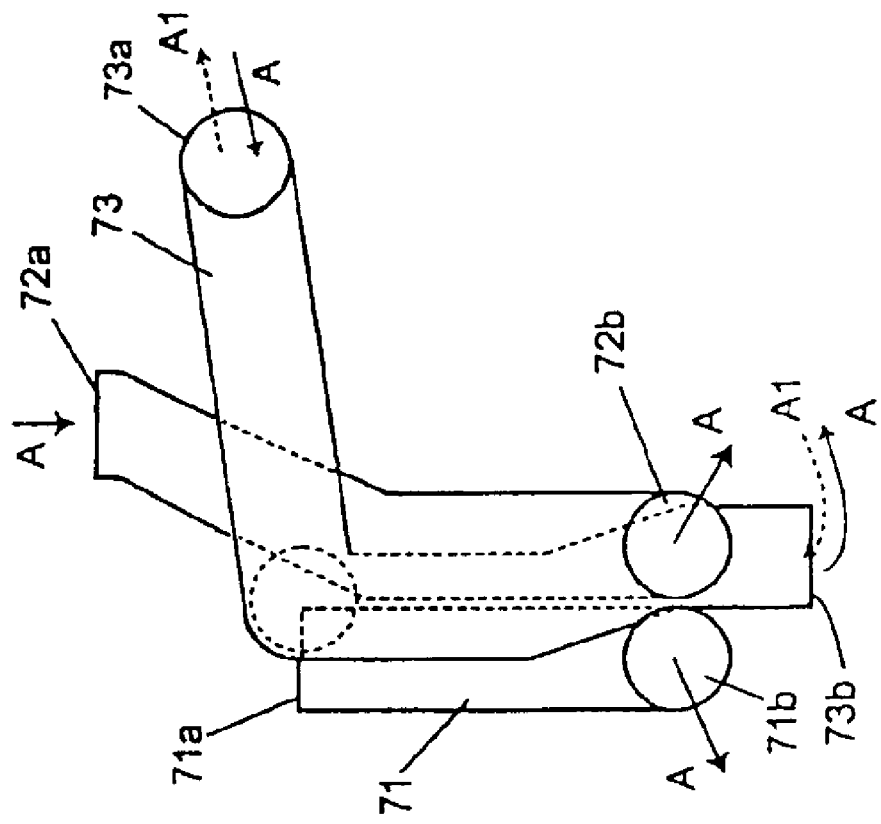

FIG. 4 is a drawing showing the air ducts, in which (a) is a top plan view, and (b) is a front plan view.

(As previously noted, throughout the following description, expressions of "front", "rear", "left", and "right" denote the directions viewed from the vantage point of a driver of the watercraft.) As shown in FIG. 1, FIG. 2, and FIG. 4, an outboard opening 71a of the first air duct 71 opens upwardly on the upper right (starboard) side of the watercraft body 11, and an inboard opening (inner opening) 71b opens laterally on the lower left (port) side of the watercraft body 11.

An outboard opening 72a of the second air duct 72 opens upwardly on the slightly right (starboard) side of the upper center of the watercraft body 11, and an inboard opening (inner opening) 72b opens laterally on the lower left (port) side of the watercraft body 11.

An outboard opening 73a of the third air duct 73 opens obliquely rearward on the slightly left (port) side of the upper center of the watercraft body 11, and an inboard opening (inner opening) 73b opens downward on the lower right (starboard) side of the watercraft body 11.

When the engine 20 is actuated, all these air ducts 71–73, for routing air through the watercraft body 11, serve as air intake ducts by air intake operation of the air cleaner case 40. Air from outside of the watercraft is introduced into the outboard openings 71a–73a of the respective air ducts, and this air then passes through the respective ducts 71–73 and outwardly from the inboard openings 71b–73b into the watercraft.

On the other hand, when the operation of the engine 20 is stopped, some of the plurality of air ducts serves as air intake ducts and the rest serve as exhaust ducts.

For example, the air ducts 71, 72 serve as air intake ducts and the air duct 73 serves as an exhaust duct. Therefore, when the engine 20 is stopped, air in the watercraft is exhausted from the inboard opening 73b of the air duct 73, through the air duct 73 and the outboard opening 73a to the outside of the watercraft, as shown by an arrow A1 shown by broken lines in FIG. 4.

As shown in FIG. 1, FIG. 2, and FIG. 4, all the inboard openings 71b, 72b, 73b of the air ducts 71, 72, 73 are disposed on the same side as the air cleaner case 40 with respect to the engine 20.

In this embodiment, the turbocharger 24 is located at the rear of the engine 20, and the air cleaner case 40 is located at the front of the engine 20. All the inboard openings 71b, 72b, 73b of the air ducts 71, 72, 73 are disposed at the front of the air cleaner case 40.

Air Cleaner Case and Fresh Air Duct Pipe

Figure 6:
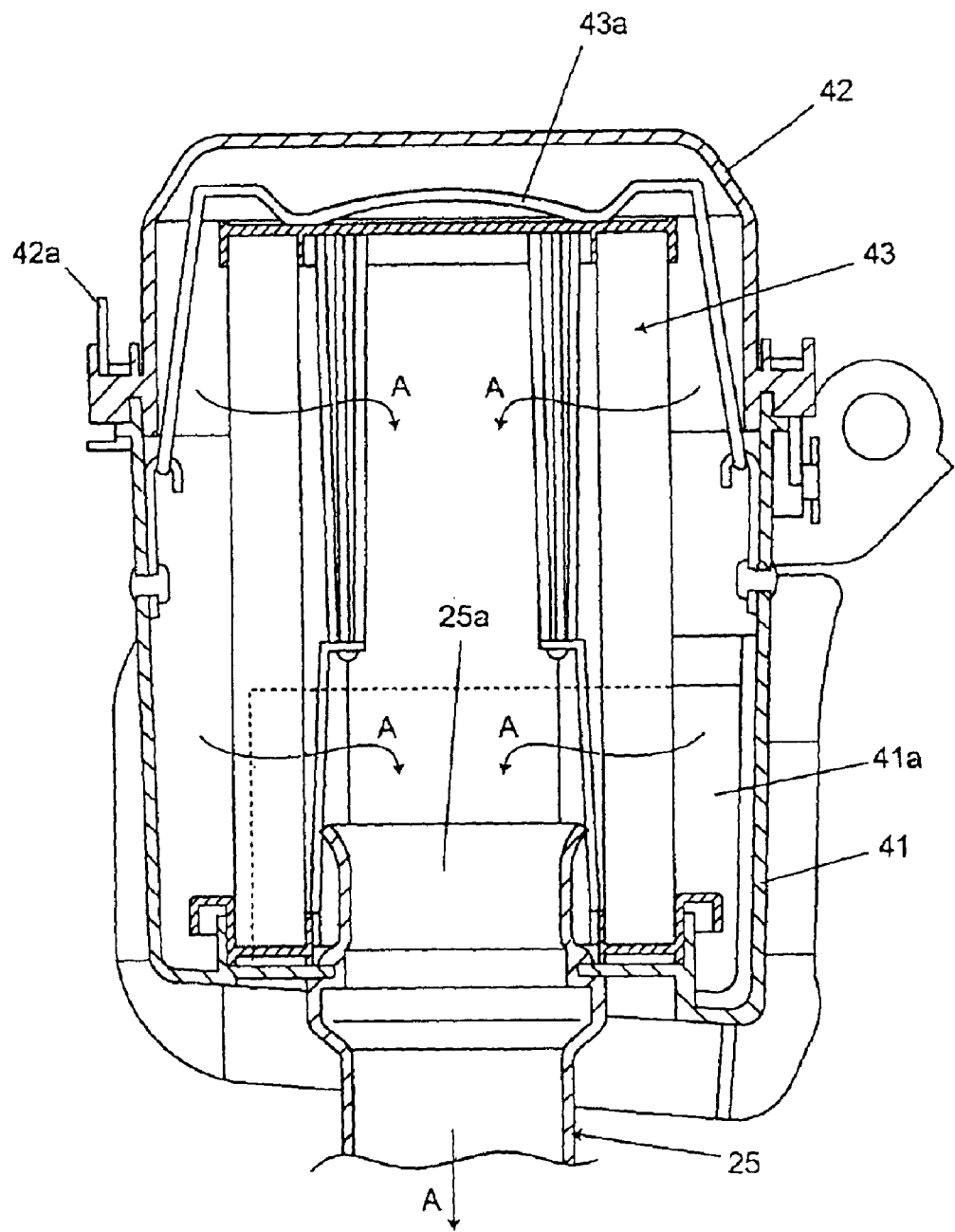
FIG. 6 is an enlarged cross-sectional view of the air cleaner case of FIG. 5, taken along the line VI—VI in FIG. 5(b).

FIG. 5 is a drawing showing an air cleaner case 40 and a fresh air duct pipe 25 according to the first embodiment of the invention, in which (a) is a top plan view, and (b) is a side plan view. FIG. 6 is an enlarged cross-sectional view of the air cleaner case taken along the line VI—VI in FIG. 5(b).

As shown in these drawings, the air cleaner case 40 includes a case body 41 and a lid 42, and has a replaceable cylindrical air cleaner element (for example, a paper element) 43 stored therein.

As shown mainly in FIG. 6, an inlet end 25a of the fresh air duct pipe 25 is connected to the air cleaner case 40 substantially at the bottom center of the case body 41, and an air intake port 41a (best seen in FIG. 5(b)) opens outwardly on the front portion of the case body 41. It will be noted that the inlet end 25a of the fresh air duct pipe 25 is disposed inside of the air cleaner case 40, and is flared outwardly at the terminal portion thereof.

The other end 25b of the fresh air duct pipe 25 is connected to the fresh air inlet of the turbocharger 24, as described above.

As shown in FIGS. 3, 5(a) and 5(b), the fresh air duct pipe 25 also includes a connecting port 25c for a breather pipe OT1 extending from an oil tank OT (See FIG. 3), and a drain port 25d for draining condensed water therefrom.

The cylindrical air cleaner element 43 is provided between the air intake port 41a and the inlet end 25a of the fresh air duct pipe 25, so as to surround the opening thereof.

Therefore, air that flows from air intake port 41a into the air cleaner case 40 is filtered by the air cleaner element 43, in the process of flowing from the periphery of the cleaner element 43 to the inlet end 25a of the fresh air duct pipe 25, which is located at the center of the air cleaner case. The air cleaner element 43 is effective to remove dust, water drops (salt as well when the small watercraft 10 is used on the ocean). After passing through the air cleaner element 43, filtered intake air is supplied through the fresh air duct pipe 25, while being cooled by the action of a water jacket (not shown) surrounding the fresh air duct pipe 25, and is supplied to the turbocharger 24 in a clean state.

Referring now to FIG. 6, it will be seen that the air cleaner element 43 may be replaced by removing a fixture 42a of the lid 42, removing the lid 42 from the case body 41, and then removing a retaining fixture (spring) 43a of the cleaner element 43. The air cleaner element 43 should be discarded and replaced when dirty, as part of normal maintenance of the engine 20.

Second Embodiment of Air Cleaner Case

Figure 7:
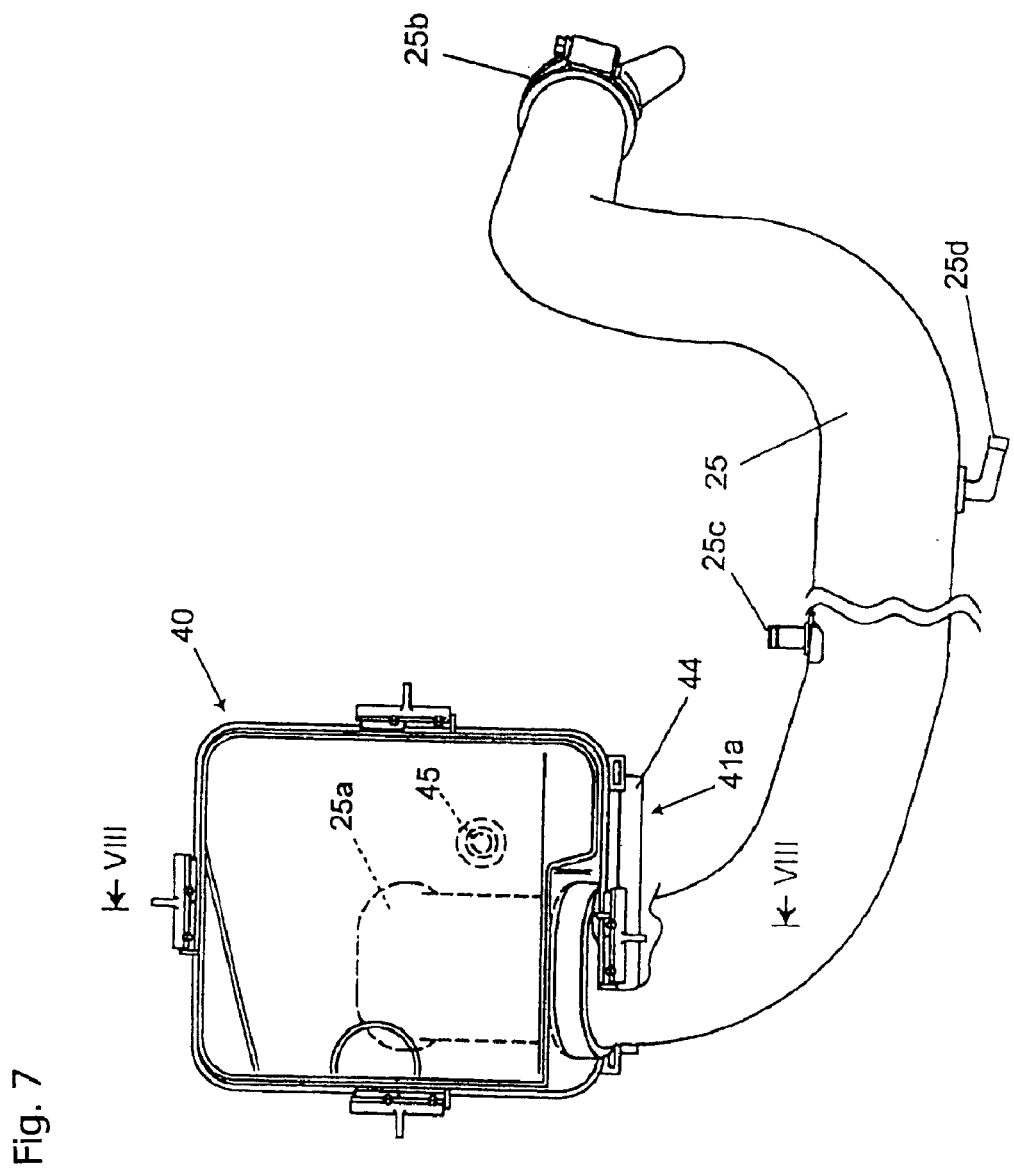
FIG. 7 is a front plan view showing an air cleaner case and a fresh air duct pipe according to a second embodiment of the invention.
Figure 8:
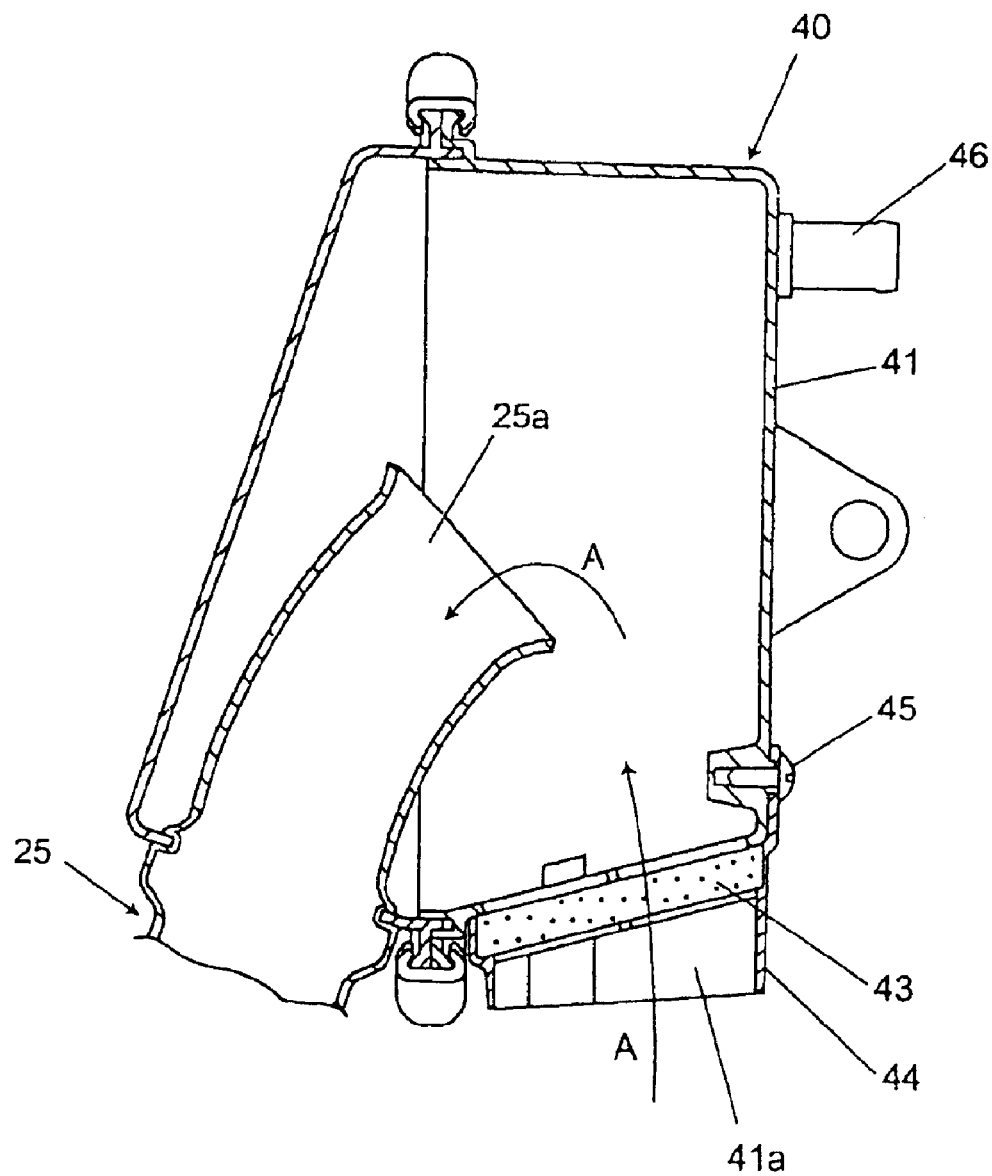
FIG. 8 is an enlarged cross-sectional view of the air cleaner case of FIG. 7, taken along the line VIII—VIII therein.

FIG. 7 and FIG. 8 are drawing showing a second embodiment of the air cleaner case and the fresh air duct pipe. FIG. 7 is a side plan view partially cut away, and FIG. 8 is a cross-sectional view of the air cleaner case of FIG. 7, taken along the line VIII—VIII therein. In these drawings, the same parts as or corresponding parts to those shown in FIG. 5 and FIG. 6 are designated by the same reference numerals.

In the air cleaner case 40, the air intake port 41a is located on the lower portion of the case body 41, and a sheet-shaped air cleaner element 43 is provided between the air intake port 41a and the intake end 25a of the fresh air duct pipe 25.

The air intake port 41a is constructed by mounting a port member 44 to the case body 41 with a screw 45, and the port member 44 is provided with a storage for the air cleaner element 43 on top thereof, so that the cleaner element 43 is sandwiched between the port member 44 and the case body 41. Therefore, the air cleaner element 43 may be easily removed and replaced by removing the port member 44.

In the embodiment of FIGS. 7–8, the case body 41 also has a connecting port 46 at the upper end thereof for the breather pipe OT1.

ADVANTAGES

According to the air intake structure for a small watercraft as described above, the following advantages are achieved.

As noted above, the watercraft body 11 includes the hull 14 and the deck 15 for covering placement on top of the hull. The engine 20 is disposed in the watercraft body 11, and the watercraft also includes the propeller 30 driven by the drive shaft 22 extending rearwardly from the engine 20, and the turbocharger 24 for pumping the air to the engine 20.

According to the present invention, the fresh air duct pipe 25 and the air cleaner case 40, for introducing fresh air to the turbocharger 24 are provided, and the turbocharger 24 and the air cleaner case 40 are located separately at the front and the rear of the engine 20, respectively. Placement of the air cleaner case 40 and the turbocharger at opposite sides of the engine 20 spaces the air cleaner case at a distance away from the turbocharger 24, which is a heat source.

Therefore, hot air around the turbocharger 24 will not be drawn into the air cleaner case 40, and thus the average temperature of intake air is lowered, air intake efficiency is improved, and the power output of the engine is improved.

Since the plurality of air ducts 71–73 for routing air through the watercraft body 11 are provided and all the inboard openings 71b–73b of the plurality of air ducts 71–73 are located on the same side of the engine 20 as the air cleaner case 40, hot air around the engine 20 will not be drawn into the air cleaner case 40. That is, most of the air taken through the air cleaner case 40 is fresh air supplied from the inboard openings 71b–73b of the air ducts 71–73.

Therefore, the air intake efficiency is improved and thus the poweroutput of the engine is improved.

Since the turbocharger 24 is disposed at the rear of the engine 20, and the air cleaner case 40 is located at the front of the engine 20, and all the inboard openings 71b–73b of the plurality of air ducts 71–73 are located at the front of the air cleaner case 40, it will be seen that the air cleaner case 40 is disposed at a location spaced away from the turbocharger 24, which is a heat source. Therefore, hot air around the turbocharger 24 will not be drawn into the air cleaner case 40.

In addition, since all the inboard openings 71b–73b of the plurality of air ducts 71–73 are located at the front of the air cleaner case 40 with respect to the engine 20, hot air around the engine 20 will not be drawn into the air cleaner case 40.

Therefore, hot air around the turbocharger 24, and hot air around the engine 20 will not be drawn into the air cleaner case 40, and hence, the air intake efficiency is further improved, the temperature of the air entering the air cleaner intake is lowered, and the power output of the engine is further improved.

Although the present invention has been described herein with respect to a limited number of specific illustrative embodiments, the foregoing description is intended to illustrate, and not to restrict the scope of the invention. Those skilled in the art will realize that many modifications of the preferred embodiment could be made which would be operable. All such modifications, which are within the scope of the claims, are intended to be within the scope and spirit of the present invention.

What is claimed is:

1. An air intake structure for a small watercraft having a watercraft body with a hull constituting the lower portion thereof and a deck covering the hull, the watercraft further having an engine disposed in the watercraft body, a drive shaft extending rearwardly from the engine, a propeller driven by the drive shaft, and a turbocharger for pumping intake air to the engine;

said air intake structure comprising an air cleaner case for drawing in fresh air, and a fresh air duct pipe for operatively connecting to the air cleaner case and for routing air from the air cleaner case to the turbocharger;

wherein said air intake structure is constructed and arranged such that when the air intake structure is installed on a watercraft engine, the turbocharger and the air cleaner case are separately disposed at opposite areas of the engine, with the engine situated therebetween.

2. The air intake structure of claim 1, wherein the air cleaner case has an opening formed therein to receive the fresh air duct pipe, and wherein the fresh air duct pipe has an inlet end which fits into the opening formed in the air cleaner case.

3. The air intake structure of claim 2, wherein the inlet end of the fresh air duct pipe is adapted to extend inside the air cleaner case.

4. The air intake structure of claim 1, wherein the fresh air duct pipe comprises an inlet end with an outwardly flared terminal portion.

5. The air intake structure of claim 2, wherein the inlet end of the fresh air duct pipe comprises an outwardly flared terminal portion.

6. The air intake structure of claim 3, wherein the inlet end of the fresh air duct pipe comprises an outwardly flared terminal portion.

7. The air intake structure of claim 1, wherein the air cleaner case has an air intake port formed therein which faces toward the front of the watercraft when installed therein.

8. The air intake structure of claim 1, wherein the air cleaner case has an air intake port formed therein which faces downwardly when installed in the watercraft.

9. The air intake structure of claim 2, wherein the opening for the intake air duct pipe is formed substantially centrally in the bottom of the air cleaner case.

10. A watercraft having the air intake structure of claim 1 installed therein.

11. A watercraft having the air intake structure of claim 1 installed therein, with the turbocharger situated in back of the engine, and the air cleaner case situated in front of the engine.

12. The watercraft of claim 11, further comprising an intercooler for cooling compressed intake air after it leaves the turbocharger.

13. The air intake structure of claim 1, further comprising a plurality of air ducts for routing air through the watercraft body, said air ducts having a plurality of inboard openings formed therein;

wherein said air intake structure is constructed and arranged such that all of the inboard openings of the plurality of air ducts therein are located on the same side of the engine as the air cleaner case.

14. A watercraft, comprising:

a watercraft body comprising a hull constituting the lower portion thereof and a deck covering the hull;

an engine disposed in the watercraft body, a drive shaft extending rearwardly from the engine, a propeller driven by the drive shaft;

a turbocharger situated for pumping intake air to the engine;

an air intake structure comprising an air cleaner case for drawing in fresh air, and a fresh air duct pipe having an inlet end operatively connected to the air cleaner case and an outlet end operatively connected to the turbocharger;

wherein said turbocharger and said air cleaner case are separately disposed at opposite areas of the engine, with the engine situated therebetween.

15. The watercraft of claim 14, wherein the air cleaner case has an air intake port formed therein which faces toward the front of the watercraft.

16. The watercraft of claim 14, wherein the air cleaner case has an air intake port formed therein which faces downwardly in the watercraft.

17. The watercraft of claim 14, wherein the air cleaner case has an opening formed therein to receive the fresh air duct pipe, and wherein the fresh air duct pipe has an inlet end which fits into the opening formed in the air cleaner case.

18. The watercraft of claim 17, wherein the opening for the intake air duct pipe is formed substantially centrally in the bottom of the air cleaner case.

19. The watercraft of claim 14, wherein the turbocharger is situated in back of the engine, and the air cleaner case is situated in front of the engine.

20. The air intake structure of claim 17, wherein the inlet end of the fresh air duct pipe is adapted to extend inside the air cleaner ease.

21. The air intake structure of claim 14, wherein the fresh air duct pipe comprises an inlet end with an outwardly flared terminal portion.

22. An air intake structure for a small watercraft having a watercraft body with a hull constituting the lower portion thereof and a deck for placement covering the hull, the watercraft further having an engine disposed in the watercraft body, a drive shaft extending rearwardly from the engine and a propeller driven by the drive shaft;

said air intake structure comprising an air cleaner case for introducing fresh air to the engine; and a plurality of air ducts for routing air through the watercraft body, said air ducts having a plurality of inboard openings formed therein;

wherein said air intake structure is constructed and arranged such that all of the inboard openings of the plurality of air ducts therein are located on the same side of the engine as the air cleaner case.

23. An air intake structure for a small watercraft according to claim 22, wherein a turbocharger is located at the rear of the engine, the air cleaner case is located at the front of the engine, and all of the openings of the plurality of air ducts are located near the front of the air cleaner case.

24. An air intake structure for a small watercraft having a watercraft body with a hull constituting the lower portion thereof and a deck covering the hull, the watercraft further having an engine disposed in the watercraft body, a drive shaft extending rearwardly from the engine, a propeller driven by the drive shaft, and a turbocharger for pumping intake air to the engine;

said air intake structure comprising an air cleaner case for drawing in fresh air, and a fresh air duct pipe for operatively connecting to the air cleaner case and for routing air from the air cleaner case to the turbocharger;

wherein said air intake structure is constructed and arranged such that when the air intake structure is installed on a watercraft engine, the turbocharger and the air cleaner case are separately disposed at opposite areas of the engine, with the engine situated therebetween such that the turbocharger is situated in back of the engine, and the air cleaner case is adapted for placement in front of the engine.

* * * * *